A. M. MURRAY & E. BENT.
Method of Manufacturing Plated-Stock for Jewelry.

No. 219,646. Patented Sept. 16, 1879.

Witnesses.
Joseph J. Scholfield
Edward Card

Inventors.
Andrew M. Murray
Edward Bent
per S. Scholfield
Attorney

UNITED STATES PATENT OFFICE.

ANDREW M. MURRAY AND EDWARD BENT, OF NORTH ATTLEBOROUGH, MASSACHUSETTS.

IMPROVEMENT IN METHODS OF MANUFACTURING PLATED STOCK FOR JEWELRY.

Specification forming part of Letters Patent No. 219,646, dated September 16, 1879; application filed August 1, 1879.

*To all whom it may concern:*

Be it known that we, ANDREW M. MURRAY and EDWARD BENT, of North Attleborough, in the State of Massachusetts, have invented an Improved Method of Manufacturing Plated Stock for Jewelry, of which the following is a specification.

Our invention consists in an improved method of manufacturing plated stock for jewelry in various colors by first plating several base-metal ingots with metals of different colors or with colored alloys, and then cutting from the rolled sheets similar plain pieces in regular forms, which, when soldered together edge to edge, will produce a composite sheet, strip, or piece of plated stock having upon one side a regularly-arranged multi-colored face, and upon the other a similarly-formed face of base metal, from which composite plate desirable forms of jewelry may be struck up, as usual, in a die.

Figure 1:
Figure 2:
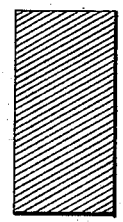
Figure 3:
Figure 4:
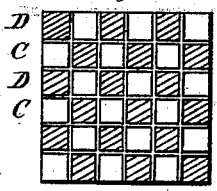
Figure 5:
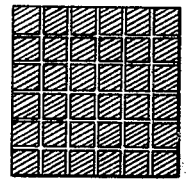
Figure 7:
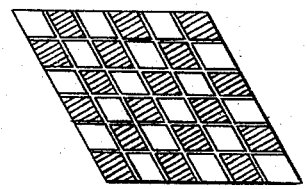
Figure 6:
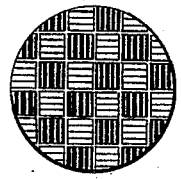
Figure 8:
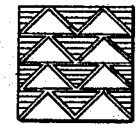

Figure 1 represents a piece of rolled stock plated with one color. Fig. 2 represents the same plated with another color. Fig. 3 represents the regular forms punched or cut from the rolled plates. Fig. 4 represents the face of the composite plate. Fig. 5 represents the back of the composite plate. Fig. 6 represents the face of a button stamped in a die from the composite plate. Figs. 7 and 8 represent plates composed of other regular forms.

From the piece of rolled stock A, plated with gold of one color, we cut out the square pieces C by punching or otherwise, and from the piece of stock B, plated with gold of another color, we cut out the similar pieces D. We then solder these pieces together alternately, edge to edge, so as to form the composite plate E, from which plate articles of jewelry may be struck up, as shown in Fig. 6, which represents the stamped face of a button.

Various elementary forms of regular pattern may be cut out of the plated sheets of stock A and C, and joined edge to edge to each other, in order to form composite sheets or pieces for stamping in a die, some examples of which are shown in Figs. 7 and 8.

We claim as our invention—

The method of producing jewelers' plate-stock out of which to manufacture articles of jewelry, which consists in taking several pieces of rolled plated stock of different colors, cut into regular forms, and soldering them together edge to edge, so as to produce upon one side of the composite plate a regularly-arranged multi-colored surface of plated metal, and upon the other a similarly-formed face of base metal, substantially as described.

ANDREW M. MURRAY.
EDWARD BENT.

Witnesses:
HARMON S. BABCOCK,
JOSEPH J. SCHOLFIELD.